(12) United States Patent
Nakagawa et al.

(10) Patent No.: US 8,409,431 B2
(45) Date of Patent: Apr. 2, 2013

(54) CHARGING APPARATUS

(75) Inventors: Koji Nakagawa, Kawasaki (JP);
Masaaki Muroi, Kawasaki (JP);
Shinichi Torigoe, Kawasaki (JP);
Fumihiro Nagaike, Kawasaki (JP);
Ryohei Nakamura, Kanazawa (JP);
Kenichi Higashi, Kanazawa (JP);
Tsuyoshi Gouda, Kanazawa (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 386 days.

(21) Appl. No.: 12/678,108

(22) PCT Filed: Sep. 25, 2008

(86) PCT No.: PCT/JP2008/067287
§ 371 (c)(1),
(2), (4) Date: Mar. 12, 2010

(87) PCT Pub. No.: WO2009/041490
PCT Pub. Date: Apr. 2, 2009

(65) Prior Publication Data
US 2010/0236998 A1 Sep. 23, 2010

(30) Foreign Application Priority Data
Sep. 28, 2007 (JP) .................. 2007-254315

(51) Int. Cl.
*B01D 29/60* (2006.01)

(52) U.S. Cl. .......... 210/109; 210/137; 210/196

(58) Field of Classification Search .......... 210/110, 210/137, 196, 109, 101
See application file for complete search history.

(56) References Cited

U.S. PATENT DOCUMENTS
5,589,077 A * 12/1996 Matsuda et al. .............. 210/741

FOREIGN PATENT DOCUMENTS

| JP | H05-346186 | 12/1993 |
|----|------------|---------|
| JP | H06-135471 | 5/1994 |
| JP | H08-057224 | 3/1996 |
| JP | H09-094421 | 4/1997 |
| JP | H10-172881 | 6/1998 |
| JP | 2001-108789 | 4/2001 |
| JP | 2002-62667 | 2/2002 |

OTHER PUBLICATIONS

International Search Report issued in corresponding PCT Application No. PCT/JP2008/067287, mailed Dec. 9, 2008.

* cited by examiner

*Primary Examiner* — Terry Cecil
(74) *Attorney, Agent, or Firm* — Knobbe, Martens, Olson & Bear LLP

(57) ABSTRACT

Intended is to reduce pressure fluctuations across a filter (14) for filtering a resist liquid. A charging apparatus is provided including a charge liquid tank (2) of resist liquid, a feed pump (10), a charge nozzle (8), a recovery passage (16), a recovery valve (20) disposed in the recovery passage (16), the filter (14), and a control device (24) for controlling the servomotors to adjust the openings of the charge valve (12) and the recovery valve (20) so that the pressures on the upstream side and the downstream side of the filter (14) may not fluctuate.

4 Claims, 3 Drawing Sheets

CHARGING APPARATUS

RELATED APPLICATIONS

This application is the U.S. National Phase filing under 35 U.S.C. §371 of PCT/JP2008/067287, filed Sep. 25, 2008, which designated the United States and was published in a language other than English, which claims priority under 35 U.S.C. §119(a)-(d) to Japanese Patent Application No. 2007-254315, filed Sep. 28, 2007. The contents of these applications are incorporated herein by reference in their entireties.

TECHNICAL FIELD

The present invention relates to a charging apparatus that charges a resist liquid, of which impurities have been removed by passing through a filter, into a container, and particularly relates to a charging apparatus in which a pressure difference before and after the filter due to a charging operation is reduced.

BACKGROUND ART

In a charging apparatus for a resist liquid, a filter is arranged in a liquid passage to capture impurities contained in the resist liquid (for example, refer to Patent Document 1 or 2). In a photoresist coating device that is disclosed in Patent Document 1, "in a supplying pipe arrangement 2, which starts from a photoresist gallon bottle 21 to a three-way valve 13, a pump 3, a filter unit 4, a three-way valve 14 and reaching an application nozzle 5, a circulating pipe arrangement 8 is provided, which directly returns from the three-way valve 14 to the three-way valve 13". In the above device, "when the coating is suspended, the photoresist is prevented from stagnating by circulating the photoresist through a cyclic line starting from the three-way valve 13 to the pump 3, the filter unit 4, the three-way valve 14 and the circulating pipe arrangement 8, and returning to the three-way valve 13".

Moreover, Patent Document 2 discloses a method of manufacturing a photoresist composition with a reduced particulate amount, in which a photoresist composition is passed through a filter, the passed photoresist composition is further led to the filter, and is circulated in a closed system, thereby removing fine particles in the photoresist composition. In the above method, by passing the photoresist composition through the filter before charging thereof, impurities in the photoresist composition are removed.

Patent Document 1: Japanese Unexamined Patent Application No. H10-172881
Patent Document 2: Japanese Unexamined Patent Publication No. 2002-62667

DISCLOSURE OF THE INVENTION

Problems to be Solved by the Invention

In the configurations of the inventions according to the respective cited publications, a resist liquid is delivered by a pump and passed through a filter to remove impurities. The impurities and the like in the resist liquid are removed and reduced in quantity with the filter in this way when the charging operation is not performed; however, when charging is performed, operations of opening and closing the charging valve result in pressure fluctuation in an upstream side and a downstream side of the filter, leading to a problem that, when the pressure fluctuation is great, the impurities in the resist liquid may pass through the filter and flow out to the downstream side in some cases.

The present invention has been made in order to solve the aforementioned problem, and an objective thereof is to provide a charging apparatus that is capable of improving accuracy of filtering a resist liquid with a filter, by suppressing, as much as possible, pressure fluctuation between an upstream side and a downstream side of the filter, the pressure fluctuation arising from operations of opening and closing a charging valve.

Means for Solving the Problems

The present invention is characterized by including: a charging liquid tank in which a charging liquid is reserved; a charging liquid passage through which the charging liquid tank communicates with a charging nozzle; a collecting passage that is branched from the charging liquid passage so as to reflux the charging liquid to the charging liquid tank; a charging valve that is provided in a downstream side to a branch portion of the collecting passage of the charging liquid passage; a collecting valve that is provided in the collecting passage; a feed pump that is provided in the charging liquid passage and delivers the charging liquid in the charging liquid tank; a filter that is provided between the feed pump and the branch portion in the charging liquid passage; a driving unit that is provided in each of the charging valve and the collecting valve and adjusts a degree of opening of each of the valves; and a controlling unit configured to control each of the driving units, in which the controlling unit controls the degree of opening of the collecting valve such that a pressure in an upstream side and a pressure in a downstream side of the filter may not fluctuate due to operations of opening and closing the charging valve during a charging operation.

Moreover, the invention according to a second aspect is characterized by further including storing unit configured to store a relationship between the degree of opening of the charging valve and the degree of opening of the collecting valve, in which the degree of opening of the charging valve and the degree of opening of the collecting valve are controlled based on the relationship.

Furthermore the invention according to a third aspect is characterized by further including pressure sensing units in the upstream side and the downstream side of the filter, in which the degree of opening of the collecting valve is controlled based on a sensed pressure.

Effects of the Invention

Since the charging apparatus of the present invention controls the degree of opening of the collecting valve such that the pressures in the upstream side and the downstream side of the filter may not fluctuate due to the operations of opening and closing the charging valve during the charging operation, it is possible to improve accuracy of filtering the resist liquid that passes through the filter.

Figure 1:
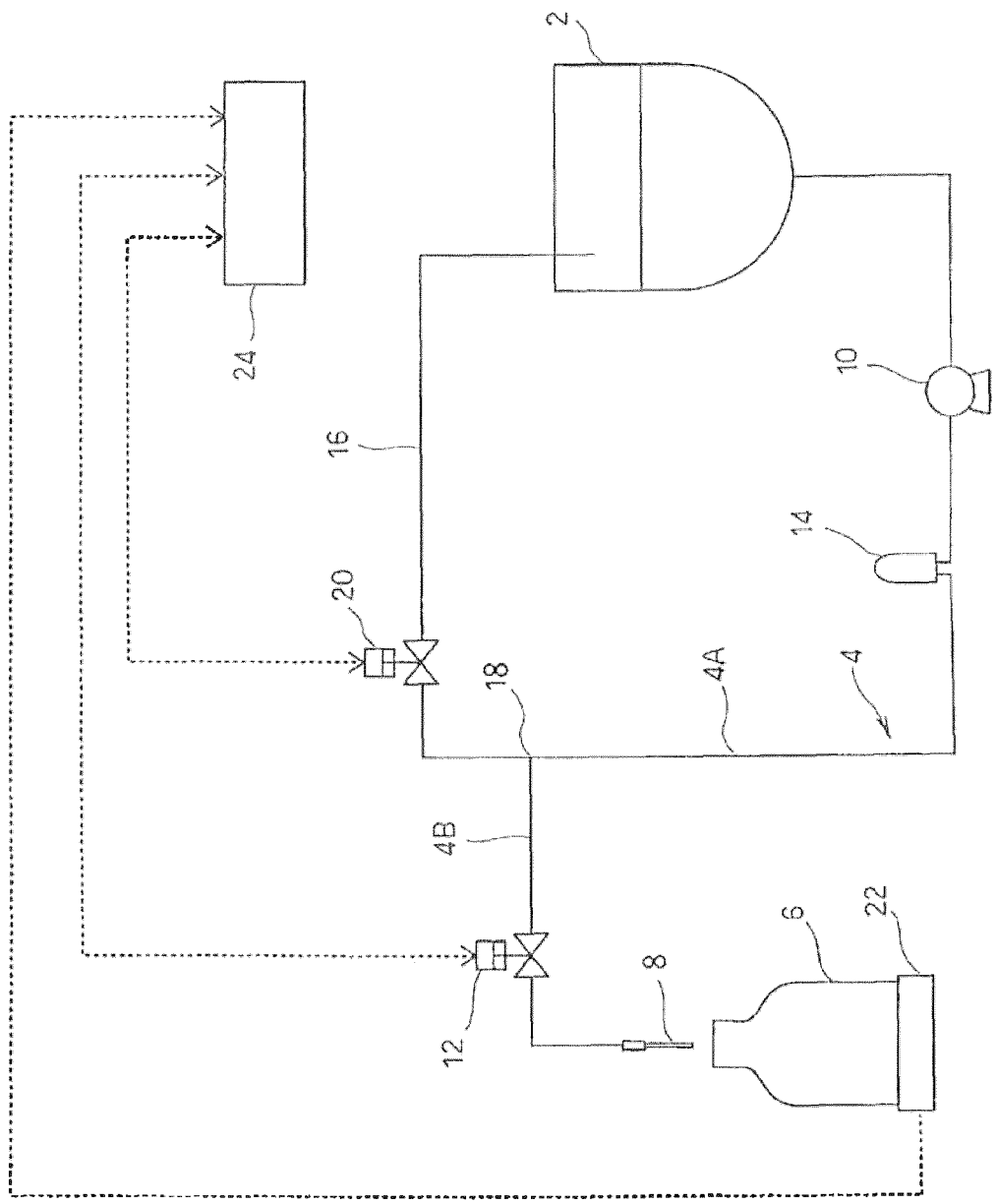
FIG. 1 is a schematic configuration diagram showing a simplified configuration of a charging apparatus (Example 1)

EXPLANATION OF REFERENCE NUMERALS 2 charging liquid tank
4 charging liquid passage
4A upstream side (upstream portion) of charging liquid passage 4B downstream side (downstream portion) of charging liquid passage
  8 charging nozzle
  10 feed pump
  12 charging valve
  14 filter
  16 collecting passage
  18 branch portion
  20 collecting valve
  24 controlling unit (controlling device)
  26 pressure sensing unit (pressure gauge)
  28 pressure sensing unit (pressure gauge)

PREFERRED MODE FOR CARRYING OUT THE INVENTION

Provided are: a charging liquid tank in which a charging liquid is reserved; a charging liquid passage through which the charging liquid is delivered from the charging liquid tank to a charging nozzle; a feed pump that delivers the charging liquid in the charging liquid tank to the charging liquid passage; a collecting passage that is branched from the charging liquid passage so as to reflux the charging liquid to the charging liquid tank; a charging valve that is provided in a downstream side to a branch portion of the charging liquid passage; a driving unit configured to adjust a degree of opening of the charging valve; a collecting valve that is provided in the collecting passage; a driving unit configured to adjust a degree of opening of the collecting valve; a controlling unit configured to control an operation of the driving units; and a filter that is provided between the feed pump and the branch portion of the collecting passage in the charging liquid passage, in which the degree of opening of the collecting valve is controlled such that a pressure in an upstream side and a pressure in a downstream side of the filter may not fluctuate due to operations of opening and closing the charging valve during a charging operation, thereby achieving an objective to reduce a pressure difference of the upstream side and the downstream side of the filter.

EXAMPLE 1

The present invention will be explained with reference to Examples. FIG. 1 is a schematic configuration diagram showing a simplified configuration of a charging apparatus according to one example of the present invention. In the drawing, a reference numeral 2 denotes a charging liquid tank that reserves a charging liquid (a resist liquid in this example), and the charging liquid tank communicates with a charging nozzle 8, which charges the resist liquid into a container 6, via a charging liquid passage 4. The charging liquid passage 4 is provided with a feed pump 10 that delivers the resist liquid from the charging liquid tank 2, and a charging valve 12 that blocks the communication of the charging liquid passage 4. The charging valve 12 is opened and closed by a servomotor (not shown) as the driving unit, and is capable of precisely adjusting the degree of opening of the valve. Moreover, a filter 14, which filters the resist liquid delivered by the feed pump 10, is provided between the feed pump 10 and the charging valve 12.

A collecting passage 16 is provided so as to branch from the middle of the charging liquid passage 4 (between the filter 14 and the charging valve 12), in order to reflux the resist liquid, which has been delivered through the charging liquid passage 4, to the charging liquid tank 2. It should be noted that, in the charging liquid passage 4 in which the collecting passage 16 is connected to a branch portion 18, a charging liquid tank 2 side to the branch portion 18 is referred to as an upstream portion 4A, and a charging nozzle 8 side to the branch portion 18 is referred to as a downstream portion 4B. In the collecting passage 16, a collecting valve 20 is provided so as to open and close the collecting passage 16 that refluxes all or part of the resist liquid which has been delivered through the upstream portion 4A of the charging liquid passage 4. The collecting valve 20 is also opened and closed by the servomotor as the driving unit (not shown), and is capable of precisely adjusting the degree of opening of the valve.

Charging weight of the container 6, into which the resist liquid is charged, is measured by a load cell 22, and a sensing signal thereof is input into controlling unit (a controlling device) 24. By way of the signal from the load cell 22, the controlling device 24 controls the servomotor that is the driving unit of the charging valve 12 and the collecting valve 20, thereby adjusting the degree of opening of the valves.

In the charging apparatus, a flow rate of the charging liquid, which is delivered from the charging liquid tank 2 to the charging liquid passage (the upstream portion 4A of the charging liquid passage) by the driving force of the feed pump 10, is set in accordance with a type of a liquid to be charged. In addition, a relationship between the degree of opening of the charging valve 12 and the degree of opening of the collecting valve 20 is obtained by experiment in advance, and the relationship is stored in storing unit provided to the controlling device 24. Since the pressure of the charging liquid that flows through the passage varies depending on conditions such as a diameter and a length of the passage, data is collected regarding how the degree of opening of the collecting valve 20 should be controlled to suppress the pressure fluctuation before and after the filter 14 when the charging valve 12 is opened under a certain condition, and a relationship that does not produce pressure fluctuation (a relationship between the degrees of opening of the charging valve 12 and the collecting valve 20) is obtained in advance.

Figure 2:
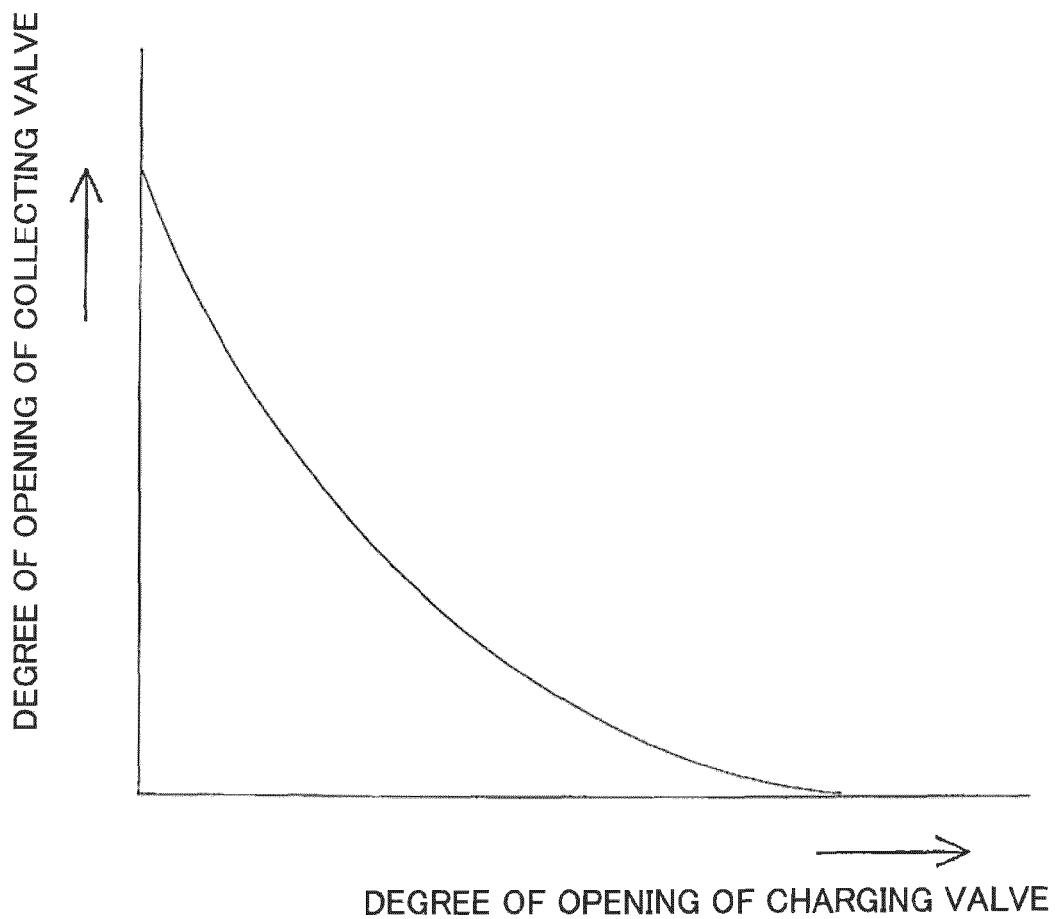
FIG. 2 is a graph showing an example of control of the charging apparatus.

FIG. 2 is a graph showing an example of a relationship between the degree of opening of the charging valve 12 and the degree of opening of the collecting valve 20, which can reduce the pressure fluctuation before and after the filter 14. If the degree of opening of the charging valve 12 and the collecting valve 20 can be controlled in a way shown in this graph, the pressure fluctuation in the upstream side and the downstream side of the filter 14 can be reduced. For example, in this example, a pressure in the upstream side of the filter 14 is set at 200 KPa, a pressure in the downstream side of the filter 14 is set at 170 KPa, and the degrees of opening of the charging valve 12 and the collecting valve 20 are controlled such that these pressures do not change. It should be noted that the flow rate by the feed pump 10 is constant at this time. In this way, the pressures in the upstream side and the downstream side of the filter 14 are maintained at the set value to eliminate the pressure fluctuation, thereby making it possible to improve the accuracy of filtering the resist liquid by the filter 14.

EXAMPLE 2

Figure 3:
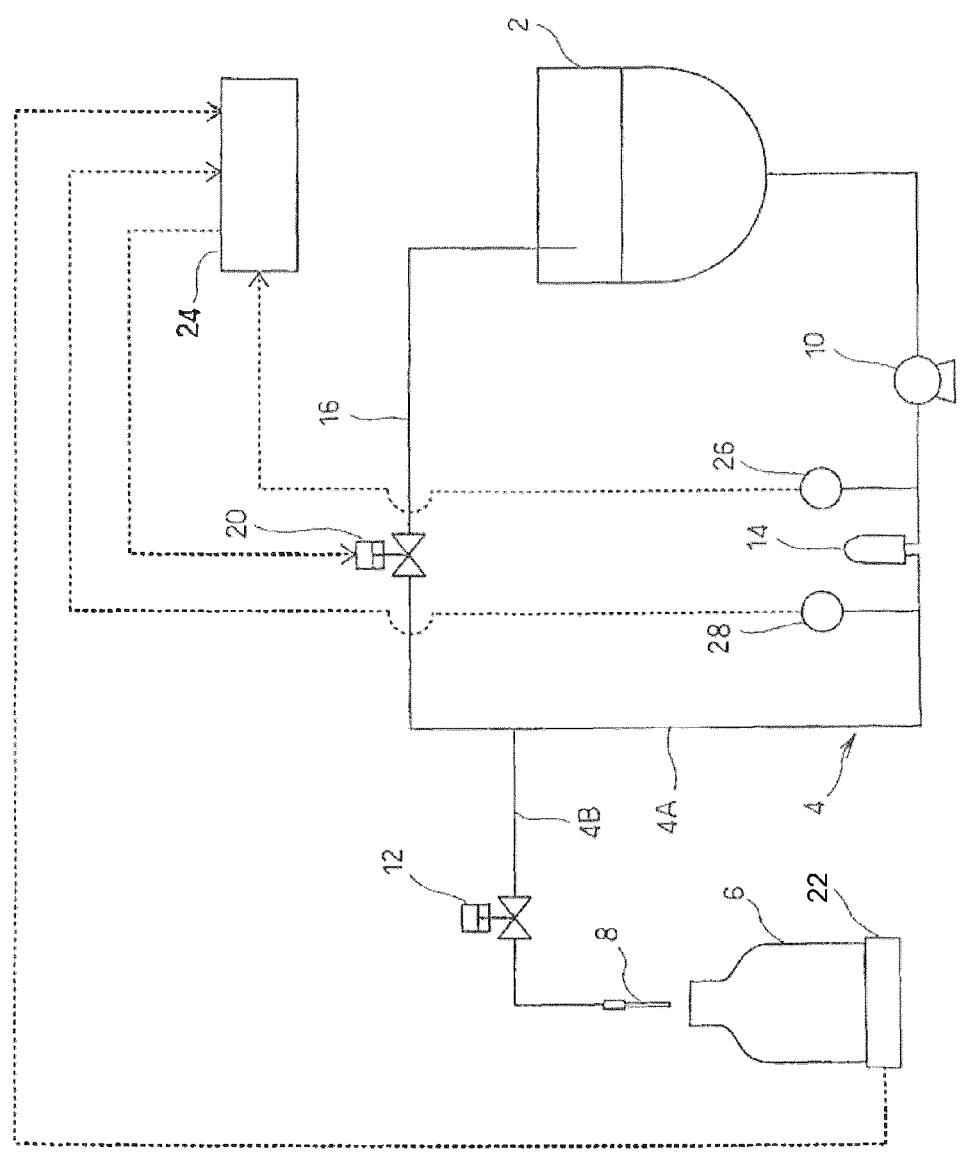
FIG. 3 is a schematic configuration diagram showing a simplified configuration of a charging apparatus according to another example (Example 2).

FIG. 3 is a schematic configuration diagram of a charging apparatus according to a second example of the present invention, and since a basic configuration thereof is common to that of the first example, the same reference numerals are assigned to the same or corresponding portions, a description thereof is omitted, and a description is provided only for different portions. In this example, pressure sensing units (pressure gauges) 26 and 28 are respectively provided to the upstream side and the downstream side of the filter 14 that is arranged in the charging liquid passage 4, and a pressure in the charging liquid in the upstream side of the filter 14 and a pressure in the charging liquid in the downstream side thereof are measured, in which the charging liquid is delivered from the charging liquid tank 2 to the upstream portion 4A of the charging liquid passage 4 by the feed pump 10, and passes through the filter 14. In addition, the degree of opening of the collecting valve 20 is controlled in accordance with the measured pressures. In this example as well, the pressure fluctuation in the upstream side and the downstream side of the filter 14 can be reduced, and the accuracy of filtering the resist liquid by the filter 14 can be improved.

The invention claimed is:

1. A charging apparatus, comprising:
   a charging liquid tank in which a charging liquid is reserved;
   a charging liquid passage through which the charging liquid tank communicates with a charging nozzle;
   a collecting passage that is branched from the charging liquid passage so as to reflux the charging liquid to the charging liquid tank;
   a charging valve that is provided in a downstream side to a branch portion of the collecting passage of the charging liquid passage;
   a collecting valve that is provided in the collecting passage;
   a feed pump that is provided in the charging liquid passage and delivers the charging liquid in the charging liquid tank;
   a filter that is provided between the feed pump and the branch portion in the charging liquid passage;
   driving units that are provided in the charging valve and the collecting valve and adjust a degree of opening of each of the valves;
   a controlling unit configured to control each of the driving units; and
   a storing unit configured to store a relationship between the degree of opening of the charging valve and the degree of opening of the collecting valve,
   wherein the controlling unit controls the degree of opening of the charging in valve and the degree of opening of the collecting valve in accordance with the relationship stored in the storing unit such that a pressure in an upstream side and a pressure in a downstream side of the filter may not fluctuate due to operations of opening and closing the charging valve during a charging operation.

2. The charging apparatus according to claim 1, wherein the greater the degree of opening of the charging valve, the smaller the degree of opening of the collecting valve.

3. The charging apparatus according to claim 1, further comprising a weight measurement unit, wherein
   the weight measurement unit is configured to measure weight of a container charged with the charging liquid and to deliver a signal representative of the weight to the controlling unit and
   the controlling unit is configured to cause each of the driving units to control the degree of opening of the charging valve and the degree of opening of the collecting valve in accordance with the delivered signal.

4. The charging apparatus according to claim 1, wherein the relationship between the degree of opening of the charging valve and the degree of opening of the collecting valve is set in accordance with a type of the charging liquid.

* * * * *